United States Patent
Ihle et al.

(10) Patent No.: US 11,535,226 B2
(45) Date of Patent: Dec. 27, 2022

(54) METHOD FOR MONITORING AN ELECTROMAGNETICALLY ACTUABLE BRAKE, AND VEHICLE HAVING AN ELECTROMAGNETICALLY ACTUABLE BRAKE

(71) Applicant: SEW-EURODRIVE GMBH & CO. KG, Bruchsal (DE)

(72) Inventors: Maximilian Ihle, Bühlertal (DE); Patrick Weis, Wössingen (DE); Christian Billet, Karlsruhe (DE); Friedrich Manz, Kraichtal-Münzesheim (DE)

(73) Assignee: SEW-EURODRIVE GMBH & CO. KG, Bruchsal (DE)

( * ) Notice: Subject to any disclaimer, the term of this patent is extended or adjusted under 35 U.S.C. 154(b) by 950 days.

(21) Appl. No.: 16/335,915

(22) PCT Filed: Jul. 20, 2017

(86) PCT No.: PCT/EP2017/025219
§ 371 (c)(1),
(2) Date: Mar. 22, 2019

(87) PCT Pub. No.: WO2018/054545
PCT Pub. Date: Mar. 29, 2018

(65) Prior Publication Data
US 2019/0263376 A1 Aug. 29, 2019

(30) Foreign Application Priority Data

Sep. 22, 2016 (DE) .................... 10 2016 011 427.4

(51) Int. Cl.
*B60T 17/22* (2006.01)
*B60B 33/00* (2006.01)
(Continued)

(52) U.S. Cl.
CPC ........ *B60T 17/221* (2013.01); *B60B 33/0092* (2013.01); *B60T 8/885* (2013.01);
(Continued)

(58) Field of Classification Search
CPC .... B60T 17/221; B60T 13/748; F16D 66/021; F16D 63/002; F16D 49/00; F16D 65/16;
(Continued)

(56) References Cited

U.S. PATENT DOCUMENTS 8,067,909 B2 * 11/2011 Davis .................... B60T 13/743
   318/371
8,604,807 B2   12/2013 Lehmann et al.
(Continued)

FOREIGN PATENT DOCUMENTS

CN    102478435 A    5/2012
CN    103459880 A    12/2013
(Continued)

OTHER PUBLICATIONS

International Preliminary Report on Patentability issued from the International Bureau dated Apr. 4, 2019.
(Continued)

*Primary Examiner* — Vishal R Sahni
(74) *Attorney, Agent, or Firm* — Carter, DeLuca & Farrell LLP

(57) ABSTRACT

In a method for monitoring an electromagnetically actuable brake, which has an energizable coil that interacts with a tractive electromagnet situated so as to be linearly movable, and a vehicle having an electromagnetically actuable brake, the current flowing through the coil is acquired, the acquired current value in particular being conveyed to an evaluation unit, the voltage applied at the coil is intermittently increased, and a relative position of the tractive electromagnet with respect to the coil is determined from the thereby
(Continued)

induced current characteristic, in particular the characteristic of the current rise, it is particularly determined from the ascertained position whether the brake is in the applied state or in the released state, the tractive electromagnet in particular is arranged as a permanent magnet or has a permanent magnet.

18 Claims, 4 Drawing Sheets

(51) Int. Cl.

| | | |
|---|---|---|
| *B60T 13/74* | (2006.01) | |
| *B62B 3/00* | (2006.01) | |
| *B62B 5/04* | (2006.01) | |
| *F16D 49/00* | (2006.01) | |
| *F16D 63/00* | (2006.01) | |
| *F16D 65/16* | (2006.01) | |
| *F16D 66/02* | (2006.01) | |
| *B60T 8/88* | (2006.01) | |
| *F16D 121/22* | (2012.01) | |
| *F16D 125/28* | (2012.01) | |

(52) U.S. Cl.
CPC ............ *B60T 13/748* (2013.01); *B60T 17/22* (2013.01); *B62B 3/00* (2013.01); *B62B 5/048* (2013.01); *F16D 49/00* (2013.01); *F16D 63/002* (2013.01); *F16D 65/16* (2013.01); *F16D 66/021* (2013.01); *B60B 33/0049* (2013.01); *B60B 33/0057* (2013.01); *B60B 33/0068* (2013.01); *B60B 33/0078* (2013.01); *B60B 2900/50* (2013.01); *B60T 2270/406* (2013.01); *B62B 2301/04* (2013.01); *F16D 2121/22* (2013.01); *F16D 2125/28* (2013.01)

(58) Field of Classification Search
CPC ....... F16D 2121/22; B62B 3/00; B62B 5/048; B62B 2301/04; B60B 33/0092
See application file for complete search history.

(56) References Cited

U.S. PATENT DOCUMENTS

| | | | |
|---|---|---|---|
| 2003/0061872 A1 | 4/2003 | Giessler | |
| 2010/0301785 A1* | 12/2010 | Davis | B60T 13/743 318/365 |
| 2015/0252861 A1* | 9/2015 | Jantunen | G01L 5/28 324/537 |
| 2018/0148022 A1* | 5/2018 | Misumi | B60T 8/171 |
| 2018/0257625 A1* | 9/2018 | Fujiwara | H02P 15/00 |

FOREIGN PATENT DOCUMENTS

| | | | |
|---|---|---|---|
| DE | 19548520 A1 | 6/1997 | |
| DE | 10149604 A1 | 4/2003 | |
| DE | 102004015447 A1 | 12/2004 | |
| DE | 102008029312 B3 | 12/2009 | |
| DE | 102012008547 A1 | 12/2012 | |
| DE | 102012005862 A1 | 9/2013 | |
| DE | 102013018272 A1 | 4/2015 | |
| DE | 112012005188 T5 | 4/2017 | |
| EP | 2930504 A2 | 10/2015 | |
| JP | H 0842613 A | 2/1996 | |
| WO | WO-2014174633 A1 * | 10/2014 | ........... F16D 65/186 |

OTHER PUBLICATIONS

International Search Report dated Sep. 29, 2017, in International Application No. PCT/EP2017/025219 (English-language translation).

* cited by examiner

METHOD FOR MONITORING AN ELECTROMAGNETICALLY ACTUABLE BRAKE, AND VEHICLE HAVING AN ELECTROMAGNETICALLY ACTUABLE BRAKE

FIELD OF THE INVENTION

The present invention relates to a method for monitoring an electromagnetically actuable brake and to a vehicle having an electromagnetically actuable brake.

BACKGROUND INFORMATION

It certain conventional systems, a brake has a coil which, when energized, is able to generate a magnetic field which is provided for the electromagnetic actuation. The release or the application of the brake is able to be induced by an energization or a lack of energization.

For example, a method for monitoring the state of a brake of a mobile component is described in German Patent Document No. 10 2013 018 272.

German Patent Document No. 10 2012 008 547 describes a method for monitoring a brake.

A method for monitoring the function of rail brakes is described in German Patent Document No. 10 2012 005 862.

SUMMARY

Example embodiments of the present invention provide for the operation of a vehicle having a brake, in particular of improving the operation.

According to an example embodiment of the present invention, in a method for monitoring an electromagnetically actuable brake which has an energizable coil that interacts with a tractive electromagnet situated so as to be linearly movable, the current flowing through the coil is acquired, the acquired current value in particular being conveyed to an evaluation unit, the voltage applied at the coil is intermittently increased and a relative position of the tractive electromagnet with respect to the coil is determined from the thereby induced current characteristic, in particular from the characteristic of the current rise, in particular, it is determined based on the determined position whether the brake is in the applied state or in the released state, and the tractive electromagnet is particularly implemented as a permanent magnet or has a permanent magnet.

This offers the advantage that the current characteristic is monitored and/or evaluated. Because of the use of the current characteristic, the coil of the brake is used as a sensor. It is therefore possible to determine the position of the tractive electromagnet based on the current characteristic, which thus makes it possible, for example, to determine the wear of the brake pad and an impermissibly high deviation from the provided operating behavior during the release or the application of the brake, that is to say, during the opening or closing of the brake.

In example embodiments, the wear state of a brake pad of the brake is determined in the applied state, i.e. at a current characteristic that starts at zero, in particular, based on the determined position, in particular, a spring element of the brake is able to press a brake pad support against a part having a brake surface, in particular a brake drum, with the aid of the tractive electromagnet in order to generate a friction torque, in particular in a currentless state of the coil. This offers the advantage that the wear state, i.e. the degree of wear, of the brake pad may be easily determined. This is because the brake pad becomes thinner with increasing wear, i.e. an increasing degree of wear, and the position of the tractive electromagnet in the applied state shifts accordingly.

In example embodiments, the opening force of the brake and/or the duration of the opening process, in particular the release process, is determined based on the current characteristic acquired during the release of the brake, i.e. the current characteristic at the change in state of the brake from the applied to the released state of the brake, and particularly is monitored with regard to the exceeding of a first threshold value and/or a drop below a second threshold value, for the display and/or the transmission of a warning and/or an error report, and/or the triggering of an action, in particular. This has the advantage that state monitoring and/or function monitoring is/are able to be carried out in an uncomplicated manner. Determining the duration of the opening process, i.e. the time interval between the release of the brake pad from the brake surface on the brake drum of the brake and the attainment of the most remote position of the tractive electromagnet when viewed from the direction of the coil, makes it possible to monitor the working path of the brake. If one of the parts of the brake required for such an effect fails or if one of the parts wears to such a degree that it may cause a shift in the positions and/or a change in the time period of the opening process as a function thereof, a risk may be identified by a corresponding determination of the change, e.g., the degree of wear of a part required for the function, which may then be displayed and/or transmitted as a warning or an error report.

In example embodiments, local extremes of the current characteristic detected when the brake is released are determined, and the duration of the opening process, in particular the release process, of the brake are determined based on the time interval of two consecutive extremes, in particular extreme ranges. This has the advantage that the time period is able to be determined in a simple manner.

In example embodiments, the ohmic resistance of the coil is determined based on the voltage applied at the coil and the current flowing through the coil, in particular during an operating state of the brake that features a constant value of the current amount, and the temperature of the brake is determined on such a basis. This offers the advantage that these determinations are easy to carry out, that is to say, require only the determination of values of electrically detectable physical quantities.

In example embodiments, during an operating state of the brake that features a substantially constant value of the current amount of the current flowing through the coil, the acquired current value is monitored with regard to the exceeding of a first threshold value and/or a drop below a second threshold value, and a warning is displayed as a function thereof and/or transmitted via a bus system. This has the advantage that simple monitoring of the function of the brake is able to be carried out.

In example embodiments, during a continuously released state, the value of the current amount of the current flowing through the coil is acquired and monitored for impermissibly high deviations, and a warning is displayed as a function thereof and/or transmitted by a data bus. This offers the advantage that a sudden failure is detectable in an uncomplicated manner.

According to an example embodiment of the present invention, in a vehicle equipped with an electromagnetically actuable brake for carrying out a previously mentioned method, wheel units are aligned on the frame of the vehicle in a rotatable manner in each case, in particular a steerable manner, and the associated axis of rotation is particular aligned in the normal direction of the driving surface, one of the wheel units has the brake, a device for acquiring the current that is flowing through the coil of the brake is provided and the device transmits the acquired current value to an evaluation unit of the vehicle.

This has the advantage that status monitoring of the brake may be carried out in an uncomplicated manner. It is merely necessary to determine the described current value and possibly the value of the voltage applied at the coil.

Further features and aspects of example embodiments of the present invention are described in greater detail below with reference to the appended Figures.

DETAILED DESCRIPTION

Figure 1:
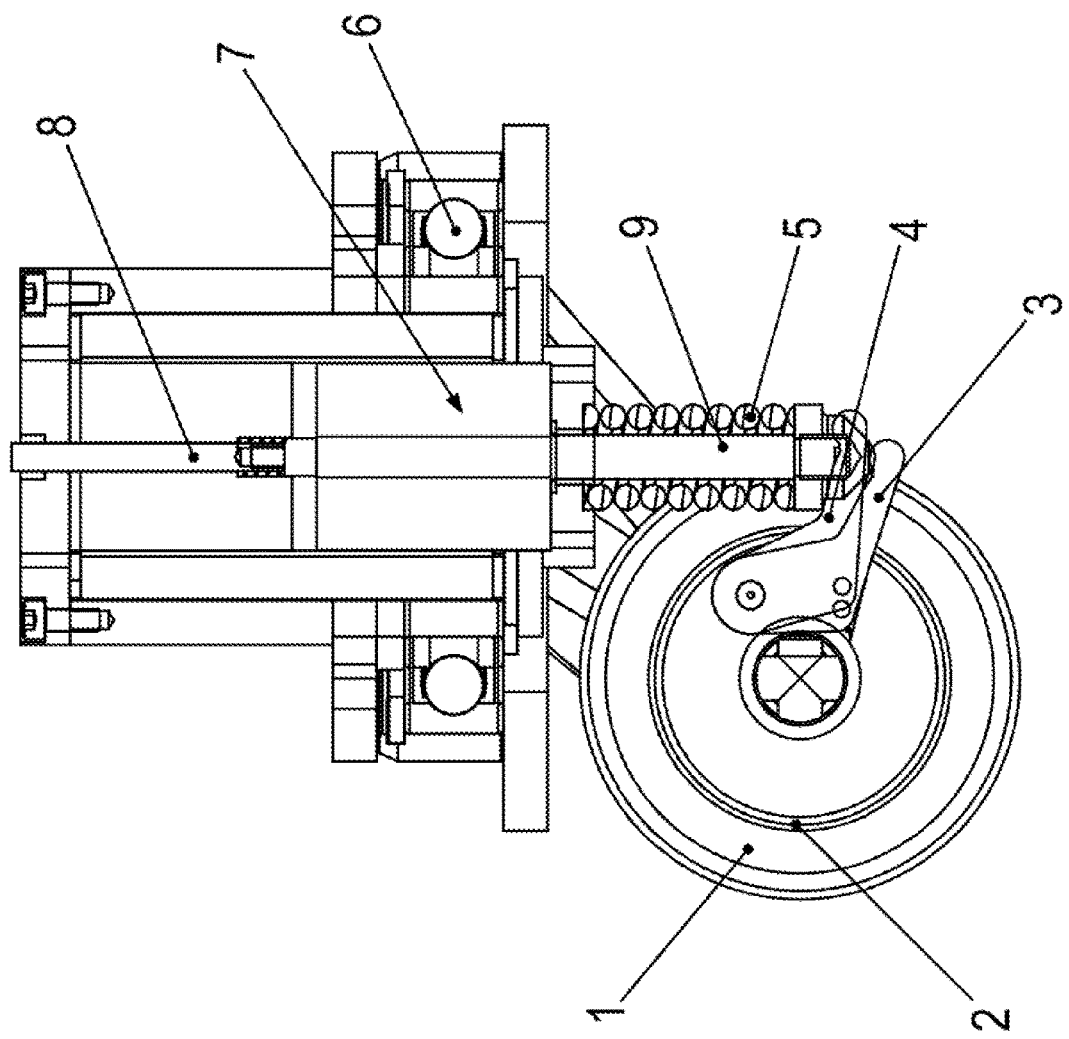
In FIG. 1, a wheel unit having an electromagnetically actuable brake of a vehicle according to an example embodiment of the present invention is shown.

As illustrated in FIG. 1, the wheel unit has a wheel 1 on which a brake drum 2 is disposed and connected in a torsionally fixed manner. Brake drum 2 thus constitutes a brake surface against which a brake pad may be pressed in order to generate a friction torque.

The brake pad is situated on a brake pad support (3, 4), which is rotatably mounted on a support part of the wheel unit.

In FIG. 1, the brake pad support is shown in a first rotational position 3 and in a second rotational position 4. The released and the applied state of the brake is therefore illustrated.

A coil 5 is situated on the wheel unit, which, when energized, pushes a linearly movable tractive electromagnet 7 out of the coil due to a repelling force which is generated by the magnetic field of coil 5 and overcomes the spring force of a spring element, tractive electromagnet 7 in particular being guided on linear guidance 8 and having a tappet section 9. As a result, tappet section 9 is pushed away from the brake pad support (3, 4), thereby releasing the brake, i.e. opening it.

The wheel unit is rotationally mounted on a frame of a vehicle with the aid of a bearing 6. The vehicle may have two or more such wheel units rotationally mounted on the frame of the vehicle.

In the non-energized state of coil 5, the spring element pushes tractive electromagnet 7 in the direction of coil 5 so that tappet section 9 presses against the brake pad support (3, 4) such that an application of the brake is induced, i.e. the brake pad of the brake pad support is pressed against brake drum 2.

Figure 2:
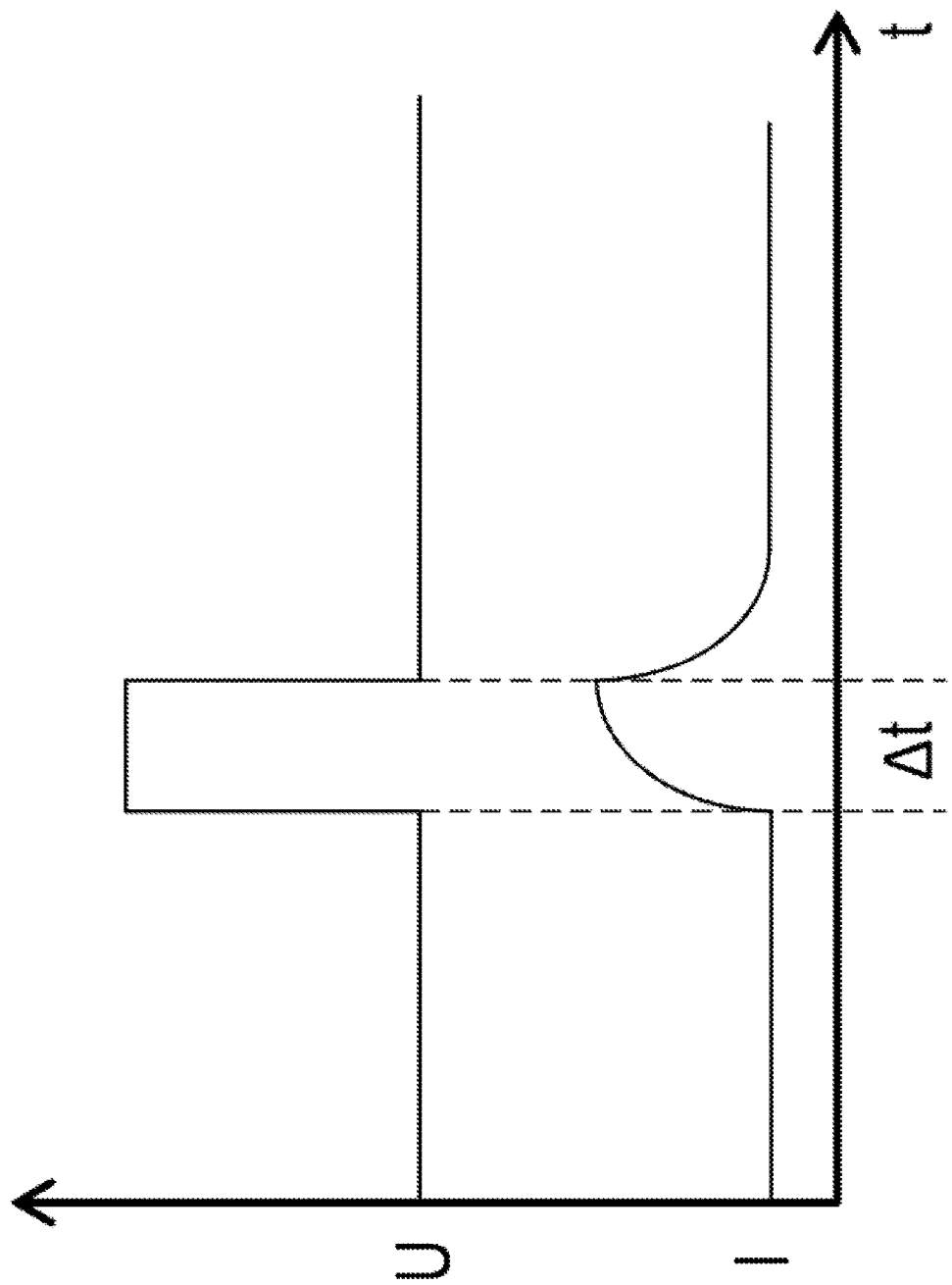
In FIG. 2, a current characteristic is shown which is induced by a temporally limited voltage increase.

As shown in the Figures, in particular in FIG. 2, the voltage effective for the continuous release of the brake is briefly increased in order to determine the lift position. The current rises during this time. Based on the associated current characteristic, the linear position of tractive electromagnet 7 with respect to coil 5 is able to be determined, in particular by determining the differential inductivity. This is because the inductivity of coil 5 decreases as the working air gap of the brake becomes larger.

The determination is carried out in an evaluation unit, to which the characteristic of the current value of the current of coil 5 acquired with the aid of a current sensor is conveyed, and by which the voltage applied at coil 5 is controllable. As a result, the position of tractive electromagnet 7 with respect to coil 5 is able to be determined based on the current response to the overvoltage pulse by determining the differential inductivity. Based on the determined position, the evaluation unit is therefore able to carry out the determination of the state of the brake. In other words, it then recognizes, based on the determined position, whether the brake is in the released or the applied state. In the released state, the brake does not generate a friction torque, and in the applied state, the brake does generate a friction torque.

In the applied state of the brake, the evaluation unit is even able to determine the degree of wear of the brake based on the determined position. In a drop below a threshold value, a warning is then able to be displayed and/or transmitted. The air gap in an applied brake becomes larger with increasing wear of the brake pad, and the position of tractive electromagnet 7 shifts accordingly.

Figure 3:
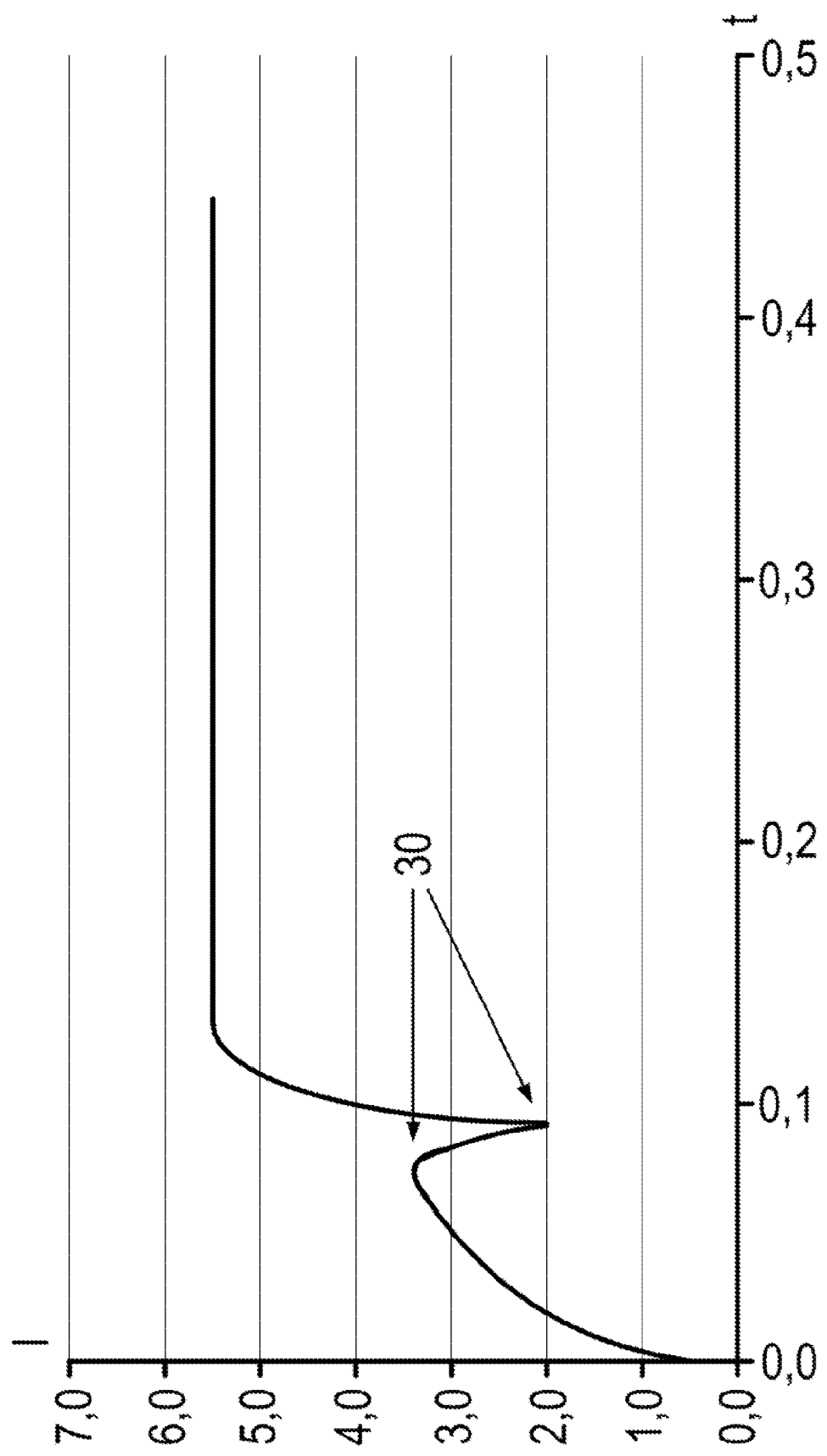
In FIG. 3, a voltage drop caused by a sudden change in inductivity during the opening of the brake is shown.

As illustrated in FIG. 3, the current through coil 5 increases when the brake is opened because a corresponding voltage is effective at coil 5. However, as soon as the magnetic field generated by coil 5 exerts a force on tractive electromagnet 7 such that tractive electromagnet 7 begins to move after overcoming the static friction and the air gap thus becomes larger, the current drops due to the decreasing inductivity and rises at a gradient that corresponds to the reduced inductivity following the drop.

From the extreme ranges 30 of the current characteristic, i.e. the highest value prior to the drop and the minimum value reached during the drop, determined by the evaluation unit through an acquisition of the current and an evaluation of the acquired current-value characteristic, the force required to release the brake is able to be determined. In addition, the time period until the brake is released may be monitored by the evaluation unit, it being monitored whether the time period exceeds a threshold value and/or drops below another threshold value. In this manner, the function of the brake during its operation is able to be monitored. A method of functioning of the brake that deviates from the desired method of functioning is therefore detectable and a corresponding warning is able to be displayed or transmitted.

Figure 4:
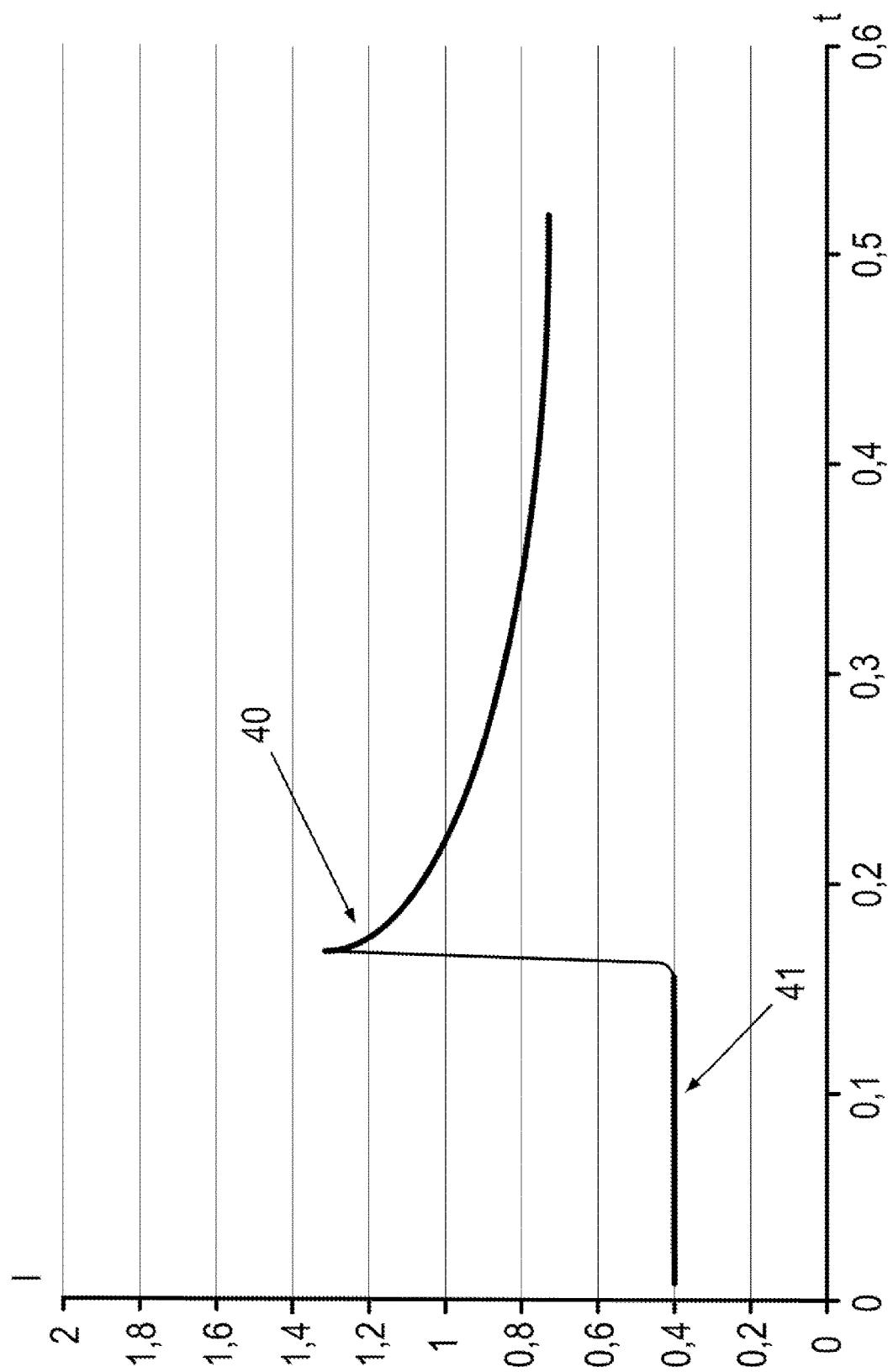
In FIG. 4, a current rise caused by the sudden closing of the brake is shown.

A predefinable current value is required to achieve the continuously released state of the brake. The evaluation unit is able to monitor this holding current 41 so that an unintended change to the applied state of the brake is detectable. This is because a sudden switch to the applied state of the brake results in an overcurrent 40, as illustrated in FIG. 4. An exceeding of a threshold value by the current is therefore characteristic of an unintended application of the brake.

Thus, if an exceeding of a threshold value is detected with the aid of the current acquisition despite the voltage that is controlled to generate the holding current, a fault will be displayed and/or transmitted by the evaluation unit via a data bus system.

Further error states are able to be identified by monitoring a provided further threshold value that lies below the value for holding current 41.

Thus, the acquired current value is, for example, monitored for impermissible deviations from a predefined value, and the evaluation unit indicates a warning or an error in this manner, e.g., in particular a line break, short-circuit, or an unintended change in state of the brake.

In addition, the evaluation unit uses the voltage applied at coil 5 and the acquired current to determine the ohmic resistance of the coil. Using the resistance value ascertained in this manner, the temperature value of coil 5 is determined on the basis of a characteristic curve or parameters stored in the evaluation unit and monitored for an exceeding of a threshold value, so that a corresponding warning may be displayed and/or transmitted via the data bus to additional bus users in the case of an overtemperature as well.

LIST OF REFERENCE NUMERALS

1 wheel
2 brake drum
3 brake pad support in a first rotational position
4 brake pad support in a second rotational position
5 coil
6 pivot bearing for wheel unit
7 tractive electromagnet
8 guidance
9 tappet section
30 extreme ranges
40 range of the overcurrent
41 range of the holding current

The invention claimed is:

1. A method for monitoring an electromagnetically actuable brake having an energizable coil that interacts with a tractive electromagnet that is linearly movable, comprising:
   acquiring a value of current flowing through the coil;
   conveying the acquired current value to an evaluation unit;
   intermittently increasing a voltage applied at the coil;
   determining a relative position of the tractive electromagnet with respect to the coil based on an current characteristic induced based on the intermittently increased voltage; and
   determining, based on the determined relative position, whether the brake is in an applied state or in a released state;
   wherein the tractive electromagnet includes a permanent magnet.

2. The method according to claim 1, wherein the current characteristic includes a characteristic of a current rise.

3. The method according to claim 1, wherein in the applied state, a wear state of a brake pad of the brake is determined from the determined position.

4. The method according to claim 3, wherein a spring element of the brake is able to press a brake pad support against a part having a brake surface and/or a brake drum with the aid of the tractive electromagnet, in order to generate a friction torque when the coil is in a currentless state.

5. The method according to claim 3, wherein the current characteristic starts at zero in the applied state.

6. The method according to claim 1, further comprising:
   determining an opening force of the brake and/or a duration of an opening process and/or a release process from the current characteristic acquired during release of the brake and/or from the current characteristic acquired at a change in state of the brake from the applied to the released state of the brake; and
   monitoring the opening force and/or the duration of the opening process and/or the release process for exceedance of a first threshold value and/or a drop below a second threshold value.

7. The method according to claim 6, further comprising displaying and/or transmitting a warning and/or an error report and/or triggering of an action based on the monitoring.

8. The method according to claim 6, further comprising:
   determining local extremes of the current characteristic acquired during the release of the brake; and
   determining the duration of the opening process and/or the release process based on a time interval of two consecutive extremes and/or extreme ranges.

9. A method for monitoring an electromagnetically actuable brake having an energizable coil that interacts with a tractive electromagnet that is linearly movable, comprising:
   acquiring a value of current flowing through the coil;
   conveying the acquired current value to an evaluation unit;
   intermittently increasing a voltage applied at the coil;
   determining a relative position of the tractive electromagnet with respect to the coil based on an current characteristic induced based on the intermittently increased voltage;
   determining, based on the determined relative position, whether the brake is in an applied state or in a released state;
   determining an ohmic resistance of the coil based on the voltage applied at the coil and the current flowing through the coil; and
   determining a temperature of the brake based on the ohmic resistance.

10. The method according to claim 9, wherein the ohmic resistance is determined in an operating state of the brake that exhibits a constant value of the current amount.

11. The method according to claim 1, further comprising:
    monitoring, in an operating state of the brake that features a constant value of current amount of current flowing through the coil, the acquired current value with regard to an exceeding of a first threshold value and/or a drop below a second threshold value; and
    displaying and/or transmitting, via a bus system, a warning as a function of the monitoring.

12. The method according to claim 1, further comprising:
    acquiring and monitoring, in a continuously released state, a value of current amount of current flowing through the coil, with regard to impermissibly high deviations; and
    displaying and/or transmitting, via a data bus, a warning as a function of the acquiring and monitoring.

13. A vehicle, comprising:
    wheel units that are aligned in a rotatable and/or steerable manner provided on a frame of the vehicle, axis of rotation associated with each wheel unit being aligned in a normal direction of a driving surface, at least one of the wheel units including an electromagnetically actuable brake;
    an evaluation unit; and
    a current acquisition device adapted to acquire a value of current flowing through a coil of the brake and to transmit the acquired value to the evaluation unit;
    wherein the vehicle is adapted to perform the method recited in claim 8.

14. The method according to claim 1, further comprising:
    determining an ohmic resistance of the coil based on the voltage applied at the coil and the current flowing through the coil; and
    determining a temperature of the brake based on the ohmic resistance.

15. The method according to claim 1, wherein the tractive electromagnet is arranged as a tractive permanent electromagnet.

16. The method according to claim 9, wherein the tractive electromagnet includes a permanent magnet.

17. The method according to claim 9, wherein the tractive electromagnet is arranged as a tractive permanent electromagnet.

18. A vehicle, comprising:
- wheel units that are aligned in a rotatable and/or steerable manner provided on a frame of the vehicle, axis of rotation associated with each wheel unit being aligned in a normal direction of a driving surface, at least one of the wheel units including an electromagnetically actuable brake;
- an evaluation unit; and
- a current acquisition device adapted to acquire a value of current flowing through a coil of the brake and to transmit the acquired value to the evaluation unit;
- wherein the vehicle is adapted to perform the method recited in claim 9.

* * * * *